United States Patent
Pinarbasi

(10) Patent No.: US 6,268,985 B1
(45) Date of Patent: Jul. 31, 2001

(54) READ HEAD HAVING SPIN VALVE SENSOR WITH IMPROVED CAPPING LAYER

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,488

(22) Filed: Mar. 30, 1999

(51) Int. Cl.[7] .................................................. G11B 5/39
(52) U.S. Cl. ........................................................ 360/324.12
(58) Field of Search ........................ 360/324, 324.1, 360/324.11, 324.12, 314; 338/32 R; 324/207.21, 252

(56) References Cited

U.S. PATENT DOCUMENTS

| | | | |
|---|---|---|---|
| 5,701,222 | * 12/1997 | Gill et al. | 360/314 |
| 5,748,399 | * 5/1998 | Gill | 360/314 X |
| 5,751,521 | * 5/1998 | Gill | 360/314 |
| 6,055,136 | * 4/2000 | Gill et al. | 360/314 |

* cited by examiner

Primary Examiner—George J. Letscher
(74) Attorney, Agent, or Firm—Gray Cary Ware & Freidenrich; Ervin F. Johnston

(57) ABSTRACT

A capping layer including thin films of ruthenium (Ru) and a metallic oxide are employed with a spin valve sensor for maintaining the MR coefficient (dr/R) of the spin valve sensor after being subjected to annealing steps which simulate hard balance of the photoresist layers in the insulation stack of a write head.

61 Claims, 10 Drawing Sheets

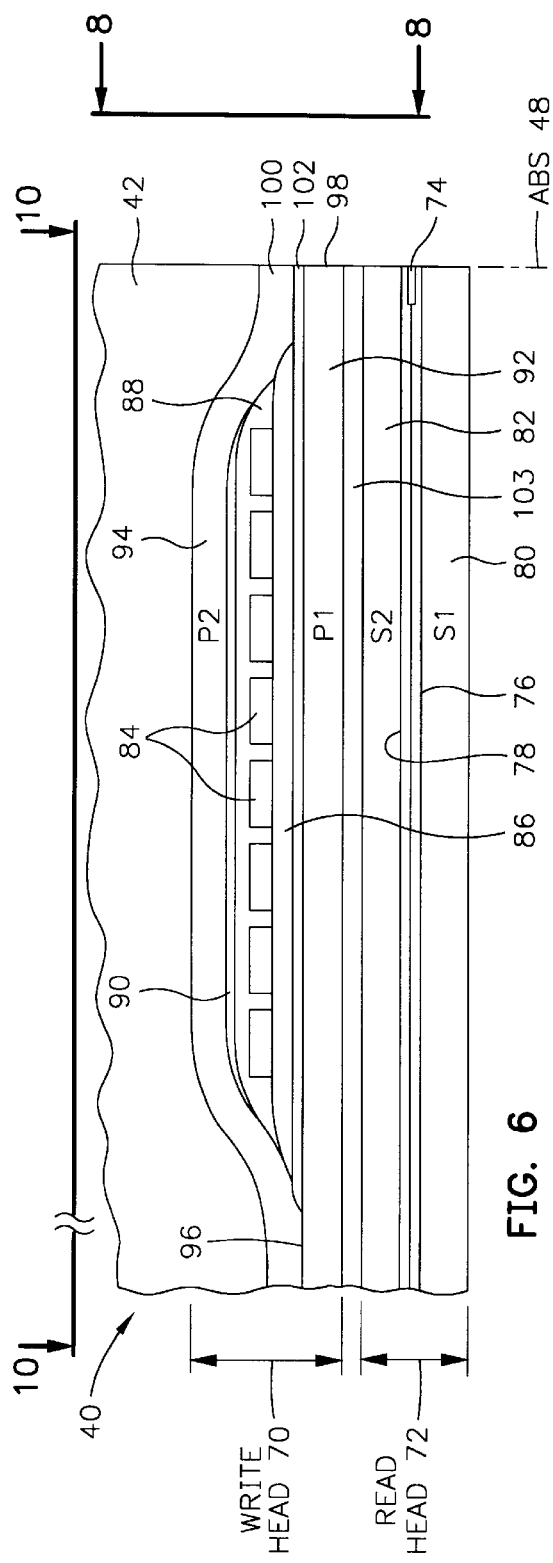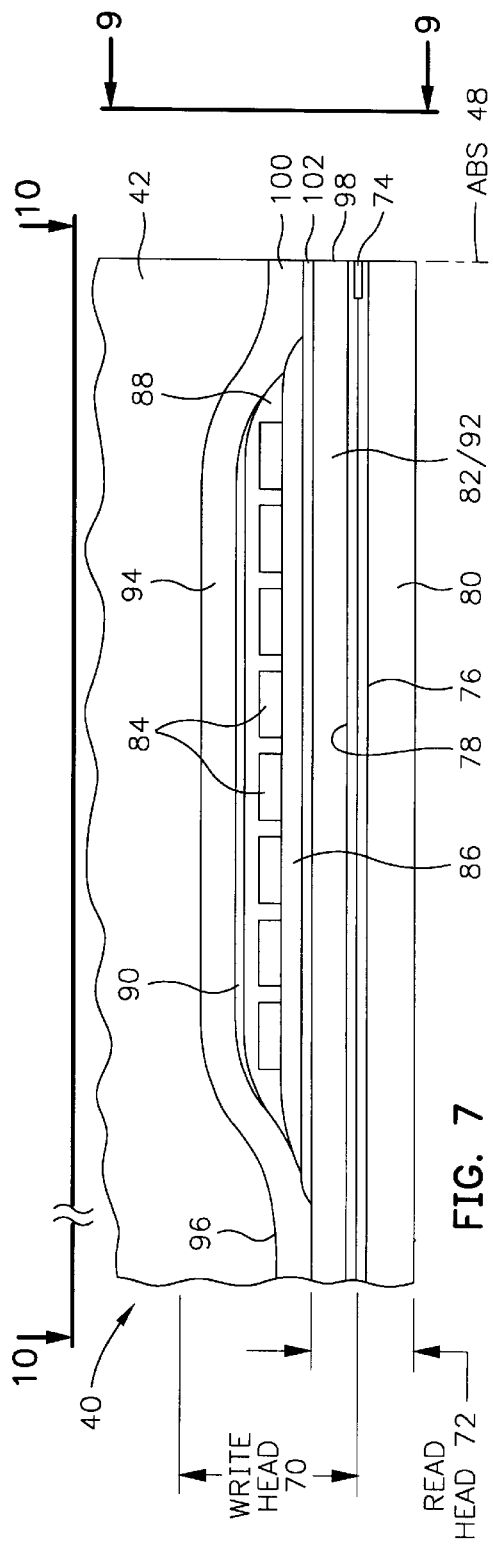

(ABS)

READ HEAD HAVING SPIN VALVE SENSOR WITH IMPROVED CAPPING LAYER

BACKGROUND OF THE INVENTION

1. Field of the Invention

The present invention relates to a read head having a spin valve sensor with an improved capping layer and, more particularly, to a capping layer which has at least two thin films for improving the magnetoresistance of the read head, the first thin film being ruthenium (Ru) and the second thin film being a metal oxide with the ruthenium (Ru) thin film being located between the metal oxide thin film and a ferromagnetic free layer in the spin valve sensor.

2. Description of the Related Art

A magnetic head assembly typically includes write and read heads wherein the write head writes magnetic bits of information into a rotating magnetic disk in a disk drive and the read head reads the magnetic bits of information from the rotating disk. The write head includes first and second pole piece layers which have a yoke region between a pole tip region and a back gap region. An insulation stack with a write coil layer embedded therein is located between the first and second pole piece layers in the yoke region, the first and second pole piece layers are separated by a nonmagnetic write gap layer at an air bearing surface (ABS), which faces the rotating disk, and the first and second pole piece layers are magnetically connected in the back gap region. The insulation stack includes multiple photoresist layers which are baked at a high temperature. This processing step can seriously degrade the performance of the read head which will be discussed in more detail hereinafter.

The read head includes a spin valve sensor and first and second lead layers that are connected to first and second side edges of the spin valve sensor for conducting a sense current therethrough. The spin valve sensor and the first and second leads are located between nonmagnetic electrically insulative first and second read gap layers and the first and second read gap layers are, in turn, located between ferromagnetic first and second shield layers. In a merged magnetic head assembly the second shield layer and the first pole piece layer are a common layer whereas in a piggyback type magnetic head assembly these are separate layers which are separated by a nonmagnetic layer.

The spin valve sensor includes a nonmagnetic electrically conductive spacer layer which is located between a ferromagnetic pinned layer and a ferromagnetic free layer. The free layer typically has a magnetic moment which is oriented parallel to the ABS and which can be rotated up or down in response to the magnetic bits of information from the rotating disk. The magnetic moment of the pinned layer is typically pinned perpendicular to the ABS by exchange coupling with an antiferromagnetic pinning layer. The free layer has a magnetoresistance which varies according to the function $\cos \theta$, where $\theta$ is the angle between the magnetic moments of the free and pinned layers. When the magnetic moments of the free and pinned layers are parallel, the magnetoresistance is zero, however, when the magnetic moments of the free and pinned layer are antiparallel the magnetoresistance is at a maximum. Assuming that the magnetic moment of the pinned layer is perpendicular and toward the ABS, positive and negative magnetic bits of information sensed by the sensor from the rotating disk rotate the magnetic moment of the free layer upwardly and downwardly respectively causing an increase and a decrease respectively in the magnetoresistance of the sensor. With a constant sense current the changes in magnetoresistance cause corresponding changes in potential which can be processed by processing circuitry as digital signals.

It is important that the magnetoresistance capability of the spin valve sensor be preserved during processing steps following the making of the spin valve sensor. The read head is typically made before the making of the write head. After constructing the spin valve sensor a reset function may be performed which is annealing the spin valve sensor at a temperature such as 230° C. for a short period of time, such as 5 minutes, in the presence of a field that is perpendicular to the ABS for setting the magnetic spins of the pinning layer in the direction of the field. After this initial reset the spin valve sensor has a magnetoresistive coefficient which is expressed as dr/R wherein dr is the change in magnetoresistance of the free layer and R is the resistance of the free layer before the change in magnetoresistance. Unfortunately, this magnetoresistive (MR) coefficient can be seriously degraded by subsequent processing steps, in particular, processing steps which construct the write head. As mentioned hereinabove, the various photoresist layers of the insulation stack in the write head are baked at a high temperature so that they will harden. This baking is typically at 230° C. to 250° C. for a period of 11 hours in a field which is perpendicular to the ABS. The field is perpendicular to the ABS for the purpose of maintaining the magnetic spins of the pinning layer perpendicular to the ABS. Unfortunately, this high temperature for such a long period of time significantly degrades the MR coefficient of the spin valve sensor in spite of the field applied perpendicular to the ABS for preserving the integrity of the pinning layer.

Accordingly, there is a strong-felt need for making spin valves that do not lose their magnetoresistance capability after baking of photoresist layers in the insulation stack of the write head.

SUMMARY OF THE INVENTION

An oxide capping layer is highly desirable since it causes what is known in the art as specular reflection. Specular reflection means that the oxide layer functions like a mirror and reflects conduction electrons toward the free layer back into a mean free path of the conduction electrons that extends between first and second side edges of the sensor. The mean free path is the distance between scattering events of the conduction electrons between the first and second side edges and may be on the order of 100 angstroms (Å). It is the scattering events at the interfaces of the free layer that changes the magnetoresistance of the sensor. The greater the scattering events the greater the magnetoresistance of the sensor. Accordingly, when conduction electrons are reflected back into the free layer by the reflective layer more electrons are involved in the scattering events which enhances the MR coefficient (dr/R).

Unfortunately, other aspects of the oxide capping layer make it undesirable. If the oxide capping layer interfaces a nickel iron (NiFe) free layer the uniaxial anisotropy ($H_K$) of the free layer is significantly increased. Uniaxial anisotropy is the amount of applied field that is required to rotate the magnetic moment of the free layer from a parallel easy axis position to a position that is perpendicular to the ABS. An increase in the uniaxial anisotropy means that the free layer is more stiff in its rotation response to applied magnetic bits of information from a rotating magnetic disk. Another common problem with an oxide capping layer is that the MR coefficient is significantly reduced after the aforementioned annealing step wherein photoresist layers of the insulation stack in the write head are baked at a high temperature. I have found that an oxide capping layer with a MR coefficient (dr/R) of greater than 4% after an initial reset of the pinning layer can be reduced to literally zero after the annealing step.

I have discovered a capping layer which overcomes the aforementioned problems of an oxide capping layer. The present capping layer does not stiffen the magnetic moment of the free layer and the MR coefficient (dr/R) of the sensor is not serious degraded after the aforementioned annealing step. The present capping layer is a double thin film structure wherein a first thin film is ruthenium (Ru) and a second thin film is a metallic oxide, such as nickel oxide (NiO), tantalum oxide ($Ta_2O_3$) or aluminum oxide ($Al_2O_5$). With this capping layer an MR coefficient (dr/R) of greater than 4% after resetting the pinning layer is decreased only to slightly less than 4% after the aforementioned annealing step. Furthermore, the present capping layer does not stiffen the magnetic moment of the free layer, especially when the free layer includes a cobalt iron (CoFe) thin film.

An object of the present invention is to provide a capping layer with metallic oxide that prevents a serious degradation of the MR coefficient (dr/R) of the spin valve sensor after an annealing step, such as baking of the photoresist layers of the write head.

Another object is to provide a spin valve sensor with a capping layer that results in a free layer with a low uniaxial anisotropy ($H_K$) and a high MR coefficient (dr/R) after annealing at a high temperature for a long time, such as 230° C.–250° C. for 11 hours.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DETAILED DESCRIPTION OF THE PREFERRED EMBODIMENTS

Magnetic Disk Drive

Figure 1:
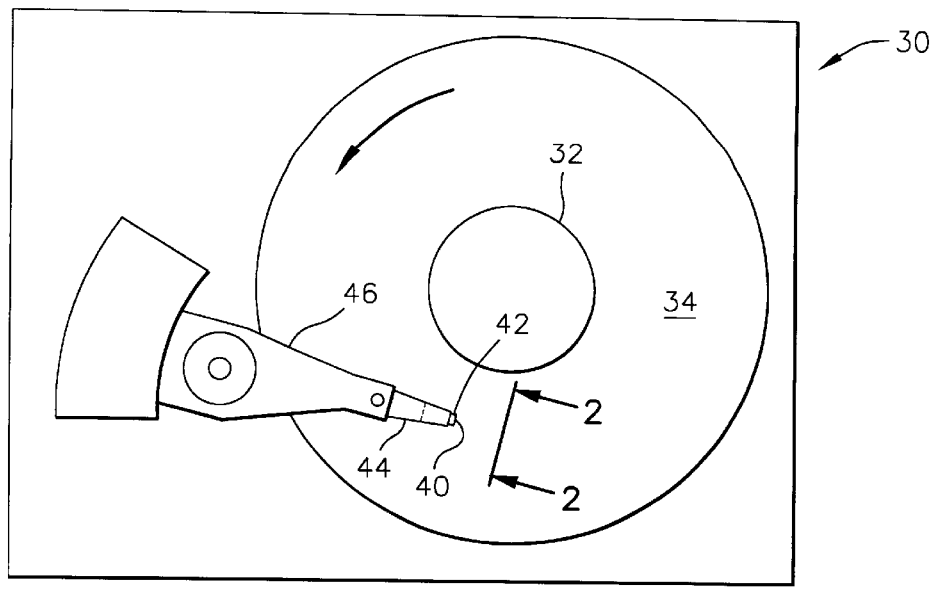
FIG. 1 is a plan view of an exemplary magnetic disk drive.
Figure 2:
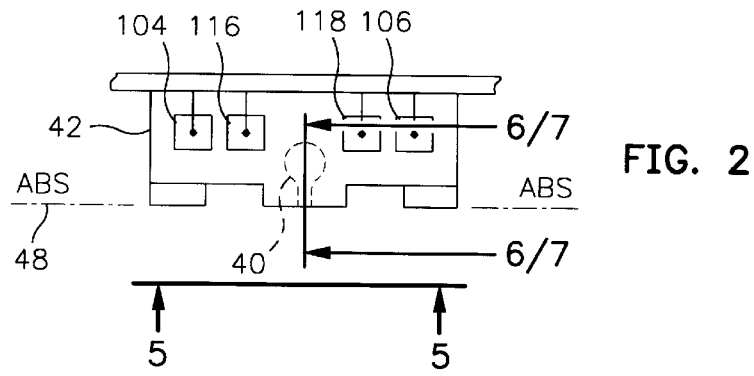
FIG. 2 is an end view of a slider with a magnetic head of the disk drive as seen in plane 2—2 of FIG. 1.
Figure 3:
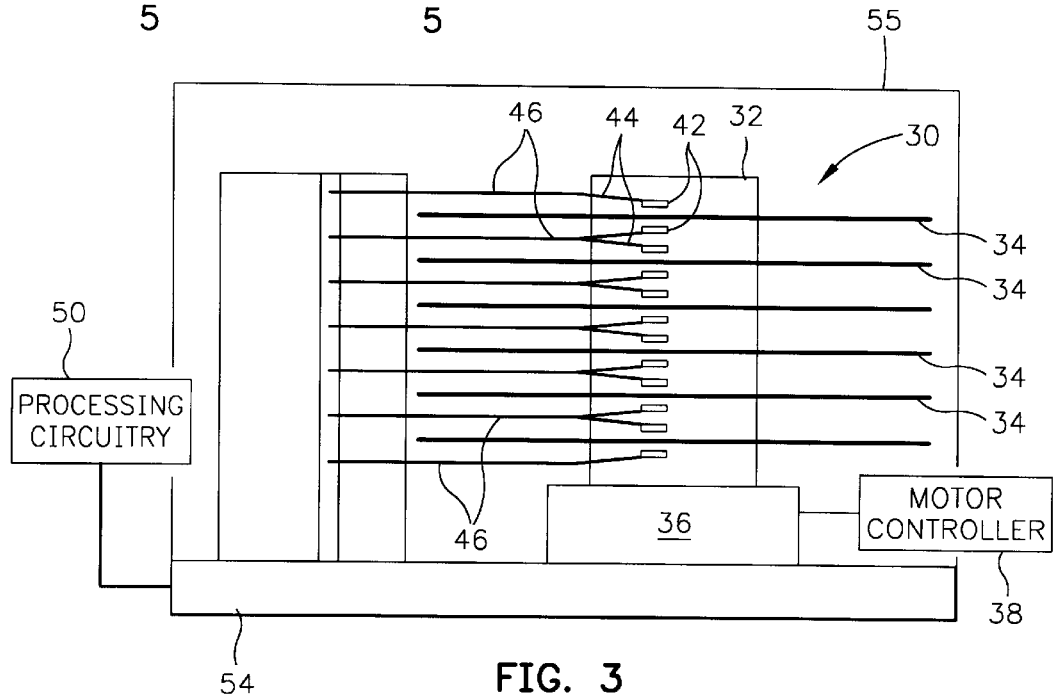
FIG. 3 is an elevation view of the magnetic disk drive wherein multiple disks and magnetic heads are employed.
Figure 4:
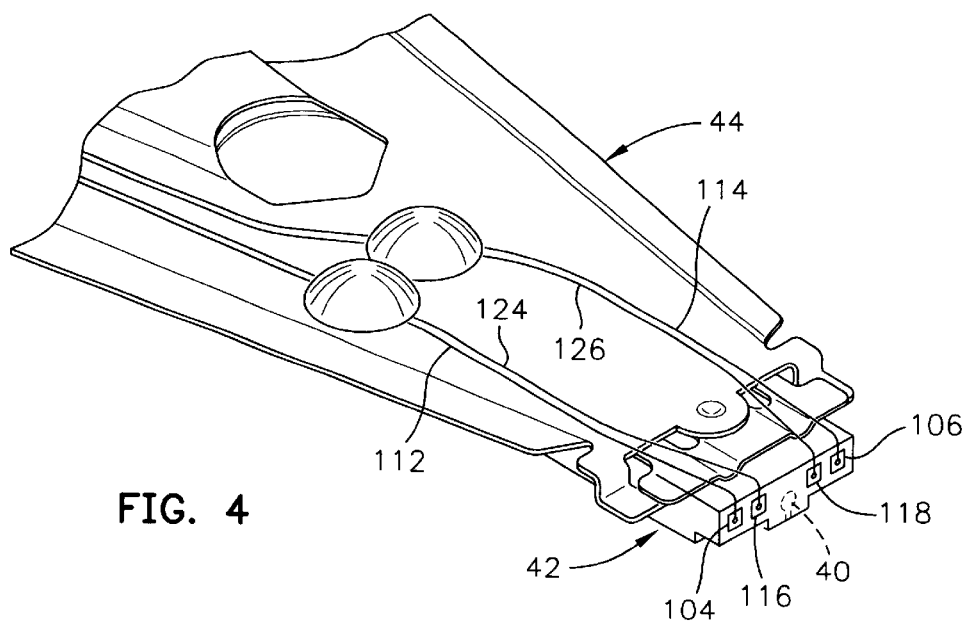
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing 55, as shown in FIG. 3.

Figure 5:
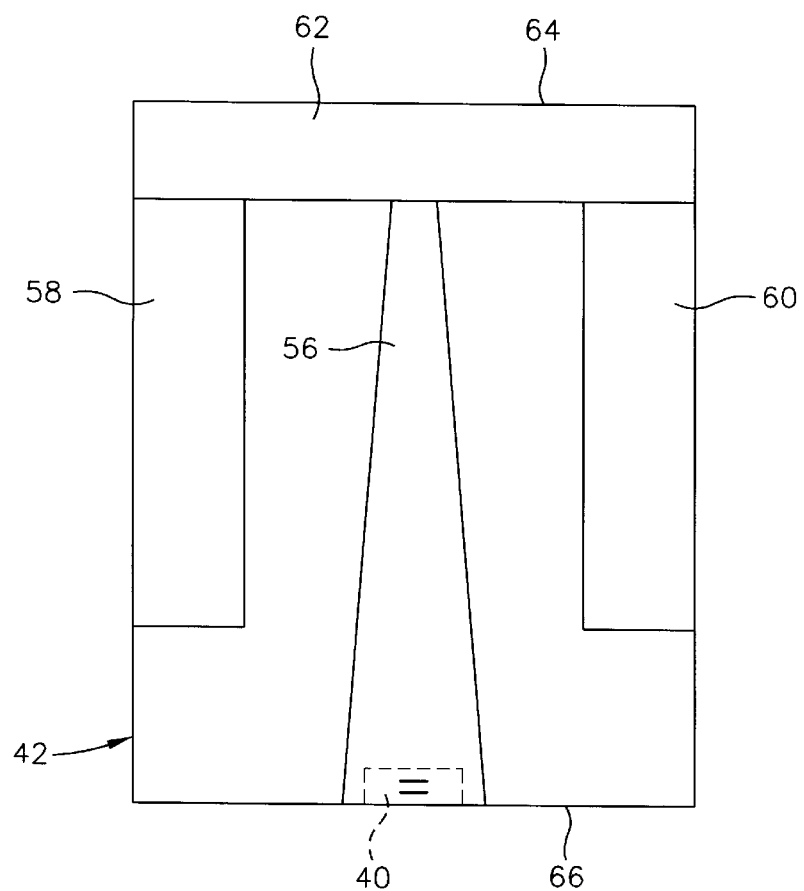
FIG. 5 is an ABS view of the slider taken along plane 5—5 of FIG. 2.
Figure 10:
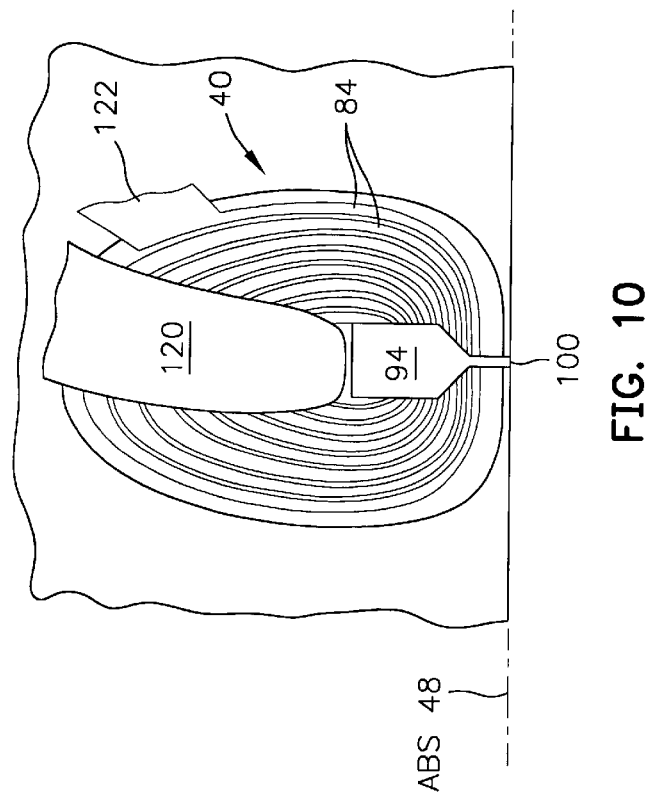
FIG. 10 is a view taken along plane 10—10 of FIGS. 6 and 7 with all material above the write coil and write coil leads removed.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a piggyback magnetic head 40, which includes a write head portion 70 and a read head portion 72, the read head portion having a spin valve sensor 74. FIG. 7 is an ABS view of FIG. 6. The spin valve sensor 74 is sandwiched between first and second gap layers 76 and 78, and the gap layers are sandwiched between first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion of the magnetic head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known in the art as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 8:
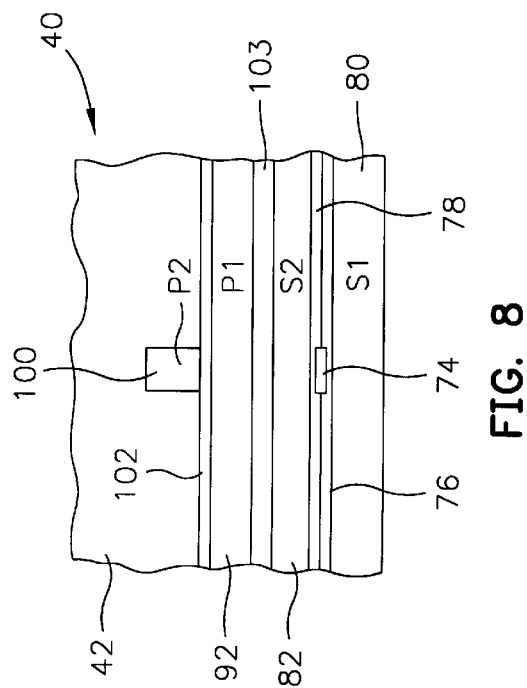
FIG. 8 is a partial ABS view of the slider taken along plane 8—8 of FIG. 6 to show the read and write elements of the magnetic head.
Figure 9:
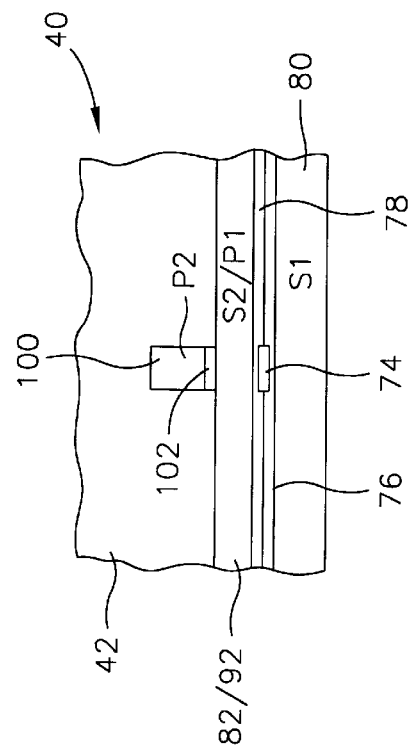
FIG. 9 is a partial ABS view of the slider taken along line 9—9 of FIG. 7 to show the read and write elements of the magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted in FIGS. 7 and 9.

Figure 11:
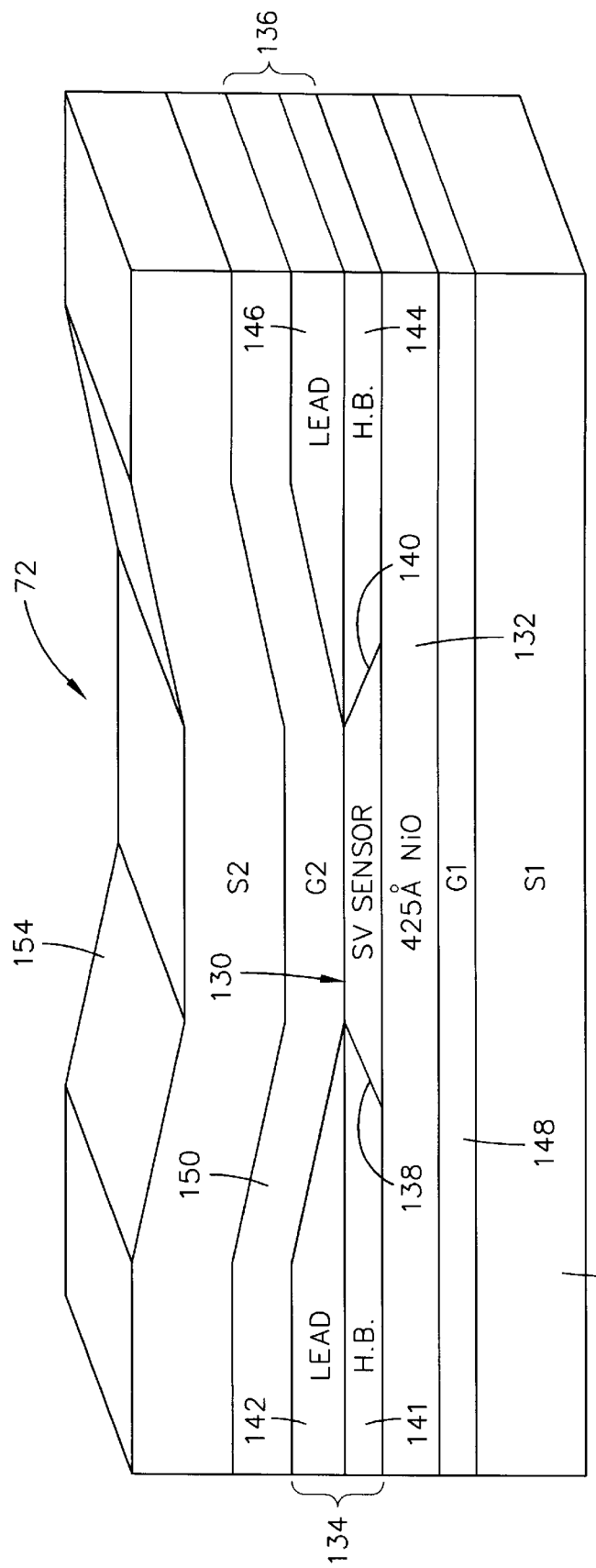
FIG. 11 is an isometric ABS illustration of a read head which employs a spin valve sensor longitudinally biased by hard biasing layers.

FIG. 11 is an isometric ABS illustration of a read head 72 which has a spin valve sensor 130. The spin valve sensor 130 may include an antiferromagnetic pinning layer 132 which may be 425 Å of NiO. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers include a first hard bias layer 141 and a first lead layer 142 and the second hard bias and lead layers 136 include a second hard bias layer 144 and a second lead layer 146. The hard bias layers 141 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

FIGS. 12–15 illustrate Examples 1–4 with four different capping layers. After the construction of each spin valve sensor in the four examples the spin valve sensor was subjected to an initial reset of the pinning layer at a temperature of approximately 230° C. for 5 minutes in the presence of a field that was directed perpendicular to the ABS in a desired direction for the magnetic spins of the pinning layer. The MR coefficient (dr/R) was then measured. Each spin valve sensor was then subjected to an annealing which simulated the baking of the photoresist layers of the insulation stack of the write head and the MR coefficient (dr/R) of the sensor was once again measured. While the capping layers in the first three examples demonstrated poor or no MR coefficient after the annealing step the present capping layer in Example 4 demonstrated a high MR coefficient (dr/R).

EXAMPLE 1

Figure 12:
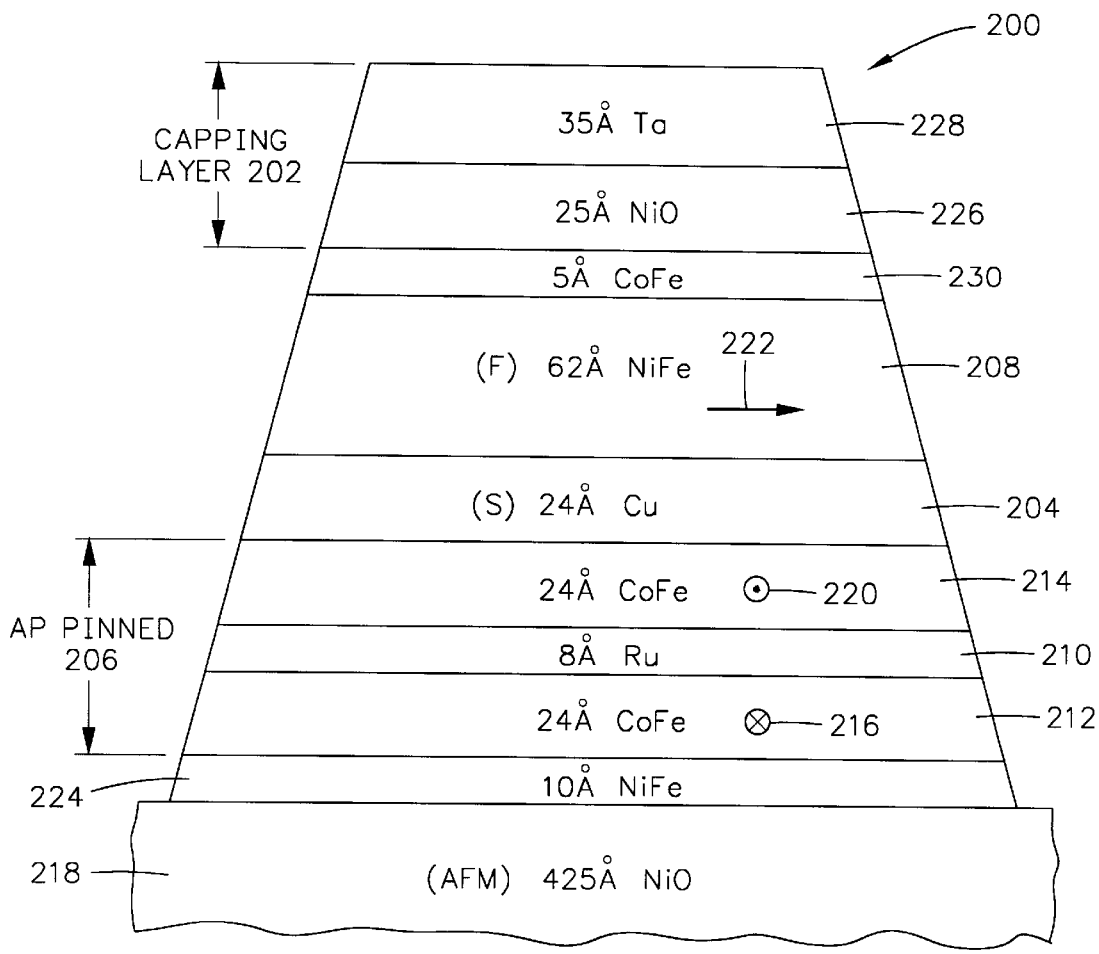
FIG. 12 is an ABS illustration of a spin valve sensor according to a first example.

FIG. 12 shows a spin valve sensor 200 which was constructed with a capping layer 202 for the purpose of investigating the MR coefficient (dr/R) of the spin valve sensor before and after annealing. In addition to the capping layer 202 the spin valve sensor 200 includes a nonmagnetic spacer (S) layer 204 which is located between an AP pinned layer 206 and a ferromagnetic free (F) layer 208. The AP pinned layer 206 includes a coupling thin film 210 between ferromagnetic first and second thin films 212 and 214. The magnetic moment 216 of the first ferromagnetic thin film 212 is pinned perpendicular to and away from the ABS by exchange coupling with an antiferromagnetic (AFM) layer 218. Because of the small thickness of the coupling thin film 210 the second ferromagnetic thin film 212 is pinned antiparallel (AP) 220 to the magnetic moment 216 of the first ferromagnetic thin film 212. Optionally, the magnetic moments 216 and 220 may be reversed if desired. It is the angular orientation between the magnetic moment 222 of the free layer relative to the magnetic moment 220 of the second ferromagnetic thin film 214 that determines the magnetoresistance of the spin valve sensor as discussed hereinabove.

An interlayer 224 of nickel iron (NiFe) is employed between the AFM layer 218 and the first ferromagnetic thin film 212. It has been found that this interlayer improves the magnetic structure of the first ferromagnetic thin film 212 as contrasted to its magnetic structure when it interfaces directly with the AFM layer 218. Improved magnetic structure of the first ferromagnetic thin film 212 improves the pinning stability of the AP pinned layer 206.

The capping layer 202 included a first metallic oxide thin film 226 which was 25 Å of nickel oxide (NiO) and a second thin film 228 which was 35 Å tantalum (Ta). An interlayer 230, which was 5 Å cobalt iron (CoFe), was employed between the free layer 208 and the first thin film 226 of the capping layer. Functionally the layers 208 and 230 form a free layer structure. It has been found that by separating the free layer 208 from the nickel oxide (NiO) capping layer with a thin cobalt iron (CoFe) layer 230 the uniaxial anisotropy ($H_K$) of the free layers is reduced so that its magnetic moment 222 is less stiff to rotation in response to applied magnetic bits of information from the rotating magnetic disk.

After construction of the spin valve sensor 200 shown in FIG. 12, the spin valve sensor was subjected to an initial reset of the magnetic spins of the AFM layer 218 by annealing the spin valve sensor at 230° C. for 5 minutes in the presence of a field directed perpendicular to and away from the ABS. The MR coefficient (dr/R) of the spin valve sensor 200 after initial reset was 4.37%. The spin valve sensor was then subjected to annealing of 230° C. for 11 hours. The MR coefficient (dr/R) then dropped significantly to 0.14%. Next, the spin valve sensor 200 was subjected to another reset of the AFM layer 218 at a temperature of 230° C. The MR coefficient (dr/R) increased slightly to 0.19%. Lastly, the spin valve sensor 200 was then subjected to annealing at 250° C. for 6 hours. After this step there was no MR coefficient (dr/R). The aforementioned results are shown in the following Chart A.

CHART A

| Step | R(/) | dR/R(%) | Hf |
| --- | --- | --- | --- |
| Ini NiO reset | 16.31 | 4.37 | 15.39 |
| 230C Anneal | 14.61 | .14 | −11.79 |
| 230 + reset | 14.78 | .19 | −16.65 |
| 250c | | No GMR | |

The chart also shows that the resistance (R) and the ferromagnetic coupling field ($H_F$) exerted by the second ferromagnetic thin film 214 on the free layer 208 were also tested at the various steps of reset and annealing. During the steps, the resistance (R) in the sensor dropped from 16.31 to 14.78. This loss is acceptable. However, the ferromagnetic coupling field ($H_F$) in the sensor dropped from a positive 15.39 to a negative 16.65. The negative indicates an antiparallel ferromagnetic coupling. This may be a problem in regard to balancing various fields exerted on the free layer so that the magnetic moment of the free layer is located parallel to the ABS.

EXAMPLE 2

Figure 13:
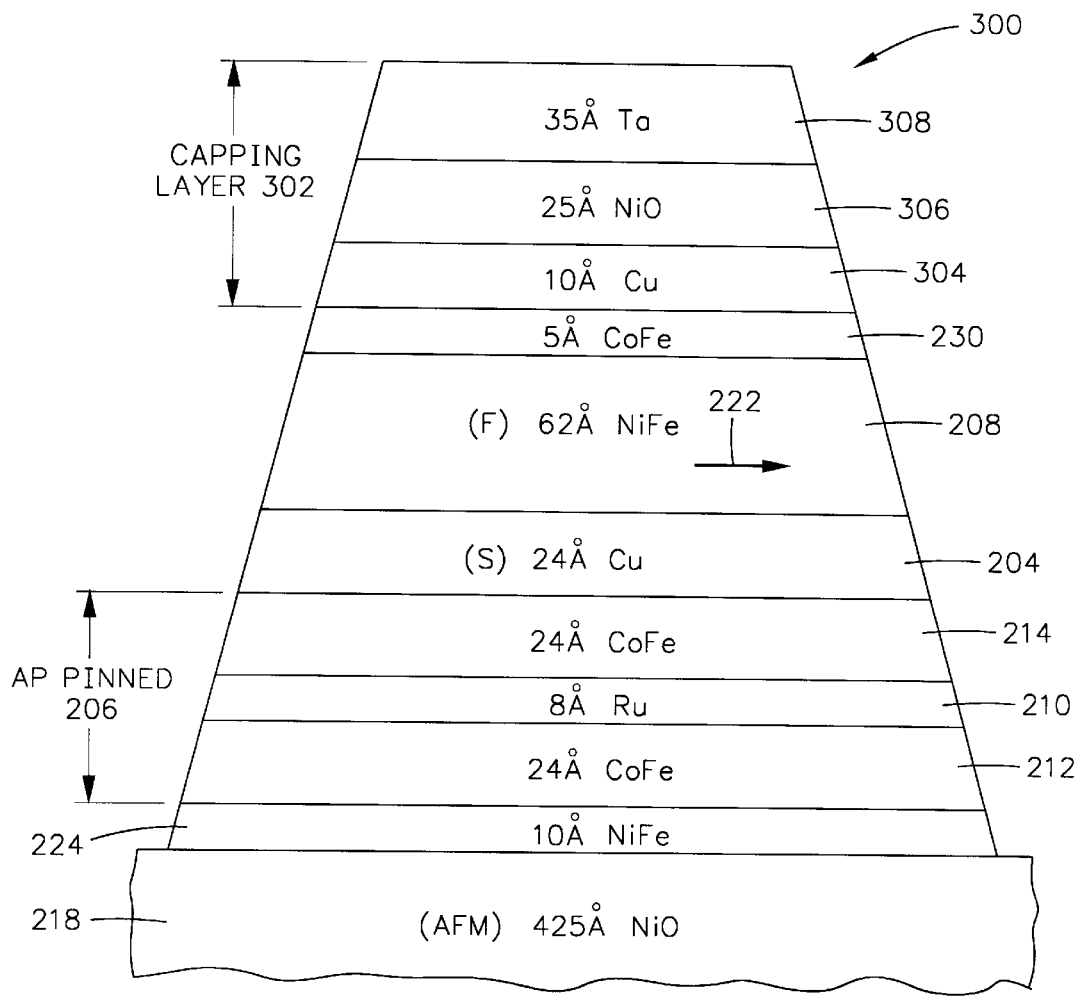
FIG. 13 is an ABS illustration of another spin valve sensor according to a second example.

A spin valve structure 300 was constructed, as shown in FIG. 13, which is the same as the spin valve structure constructed in FIG. 12, except for a capping layer 302. The capping layer 302 included a first thin film 304, which was 10 Å of copper (Cu), on the interlayer 230, a second thin film 306, which was 25 Å of nickel (NiO) on the first thin film 304 and a third thin film 308, which was 35 Å of tantalum (Ta), on the second thin film 306. After completing the spin valve sensor 300 and subjecting it to an initial reset the MR coefficient (dr/R) was found to be 4.31%. After a first annealing of 230° C. for 11 hours the MR coefficient (dr/R) dropped to 0.07%. After a second reset at 230° C. the MR coefficient (dr/R) increased slightly to 0.14%. After a final annealing at 250° C. for 6 hours the MR coefficient (dr/R) was 0. It can be seen that there was a serious degradation of the MR coefficient (dr/R) after the first annealing. These results are shown in the following Chart B.

CHART B

| Step | R(/) | dR/R(%) | Hf |
| --- | --- | --- | --- |
| Ini NiO reset | 15.25 | 4.31 | 4.49 |
| 230C | 14.44 | .07 | −50.43 |
| 230 + reset | 14.52 | .14 | −50.49 |
| 250c | | No GMR | |

It can also be seen from the chart that the resistance (R) dropped slightly after the first annealing step. However, after the first annealing step the ferromagnetic coupling field ($H_F$) dropped to a negative 50.43 which is a large antiparallel ferromagnetic coupling field exerted by the second ferromagnetic thin film 214 on the free layer 208.

EXAMPLE 3

Figure 14:
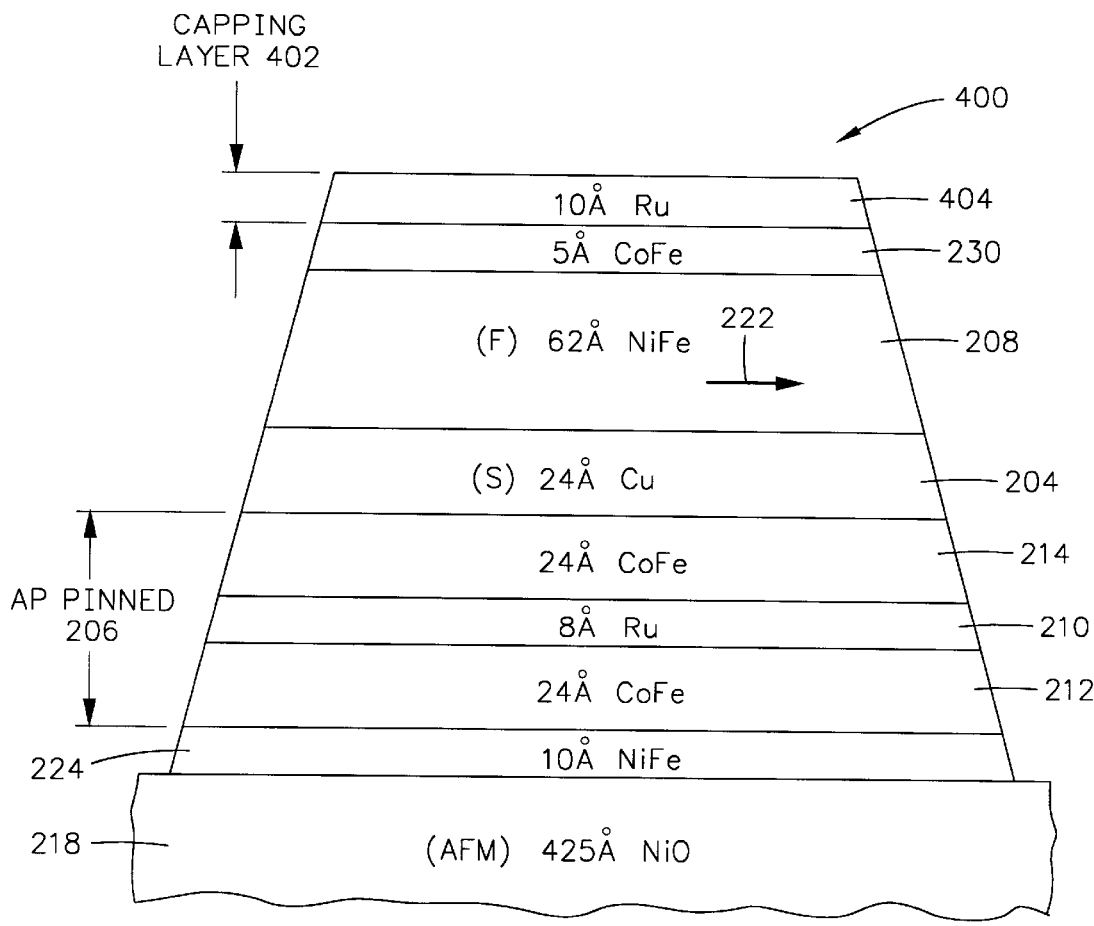
FIG. 14 is an ABS illustration of a further spin valve sensor according to a third example.

The spin valve sensor 400 shown in FIG. 14 is the same as the spin valve 200 in FIG. 12, except for the capping layer 402. The capping layer 402 was a single thin film 404, which was 10 Å of ruthenium (Ru), on the interlayer 230. After subjecting the spin valve sensor 400 to an initial reset the MR coefficient (dr/R) was 4.32%. After subjecting the spin valve sensor 400 to the first annealing step of 230° C. for 11 hours the MR coefficient (dr/R) dropped to 3.40%. After the second reset at 230° C. the MR efficient (dr/R) increased slightly to 3.51%. After the final annealing at 250° C. for 6 hours the MR coefficient (dr/R) dropped to 2.91%. After reset at 250° C. the MR coefficient (dr/R) dropped slightly to 2.85%. It can be seen from this example that the MR coefficient (dr/R) of the spin valve sensor 400 was significantly improved compared to the MR coefficient (dr/R) of the spin valve sensors 200 and 300 in Examples 1 and 2. The results are shown in the following Chart C.

CHART C

| Step | R(/) | dR/R(%) | Hf |
| --- | --- | --- | --- |
| Ini NiO reset | 15.14 | 4.32 | 4.67 |
| 230C | 15.88 | 3.4 | 4.43 |
| 230 + reset | 15.66 | 3.51 | 4.73 |
| 250c | 16.23 | 2.91 | 4.31 |
| 250 + reset | 16.8 | 2.85 | 2.99 |

It can also be seen from the chart that the resistance (R) and the ferromagnetic coupling field ($H_F$) did not vary significantly after the spin valve sensor 400 was subjected to the various steps.

EXAMPLE 4

The Invention

Figure 15:
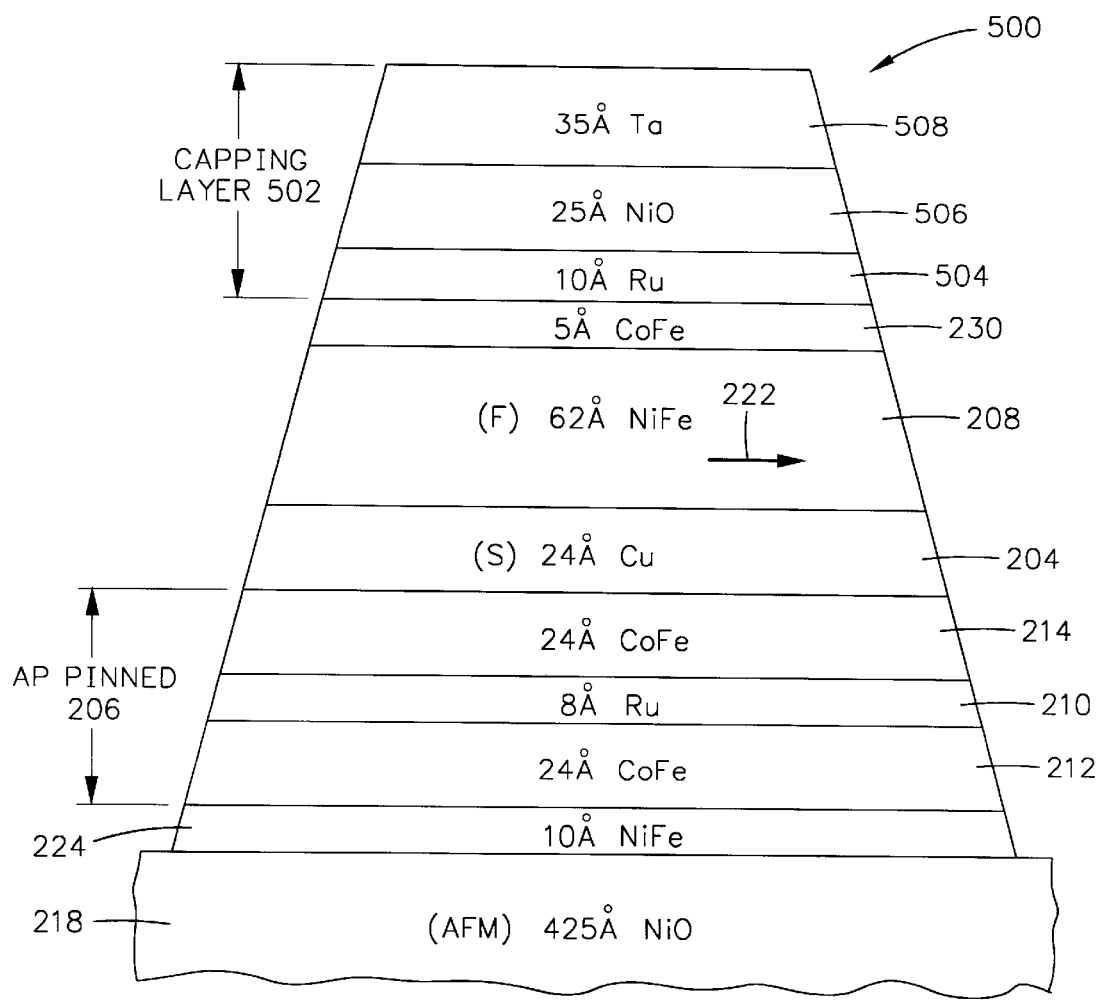
FIG. 15 is an ABS illustration of the present spin valve sensor according to a fourth example.

The spin valve sensor 500 in FIG. 15 demonstrates the present invention and has the same structure as the spin valve sensor 200 in Example 1 except for the capping layer 502. The capping layer 502 includes first and second films 504 and 506 wherein the first film 504 was on the interlayer 230 and the second thin film 506 was on the first film 504. The first thin film 504 was 10 Å of ruthenium (Ru) and the second film 506 was 25 Å of nickel oxide (NiO). Optionally, the capping layer 502 may include a third film 508 which may be 35 Å of tantalum (Ta). The important aspect of this invention is that one or more thin films of a metal oxide are separated from the interlayer 230 or from the nickel iron (NiFe) free thin film 208 by ruthenium (Ru). After subjecting the spin valve sensor 500 with a capping layer including the three films 504, 506 and 508 to an initial reset, the MR coefficient (dr/R) was 4.65%. After subjecting the spin valve sensor to the first annealing of 230° C. for 11 hours, the MR coefficient (dr/R) dropped to 3.61%. After subjecting the spin valve sensor 500 to a second reset at 230° C. the MR coefficient (dr/R) increased to 4.01%. After annealing the spin valve sensor 500 at 250° C. for 6 hours, the MR coefficient (dr/R) dropped to 3.37%. An additional step was taken with the spin valve sensor 500 by subjecting it to a third reset at a temperature of 250° C. The MR coefficient (dr/R) increased to 3.82%. In a comparison with the other examples after the second annealing at 250° C. for 6 hours the MR coefficient (dr/R) of the present invention was significantly greater than the MR coefficient (dr/R) of the first and second examples and showed an increase over the MR coefficient (dr/R) of the third example. These results are shown in the following Chart D.

CHART D

| Step | R(/) | dR/R(%) | Hf |
| --- | --- | --- | --- |
| Ini NiO reset | 16.20 | 4.65 | 5.81 |
| 230C | 16.66 | 3.61 | 5.45 |
| 230 + reset | 15.60 | 4.01 | 6.11 |
| 250c | 16.1 | 3.37 | 6.23 |
| 250 + reset | 16.47 | 3.82 | 6.95 |

It can also be seen from the above chart that the resistance (R) in the ferromagnetic coupling field ($H_F$) did not vary considerably after the sensor 500 was subjected to the various steps. The ruthenium (Ru) layer was purposely kept relatively thin at 10 Å since it is conductive and will shunt a portion of the sense current. A shunting of the sense current reduces the effectiveness of the spin valve sensor.

It should be understood in a broad concept of the invention that the capping layer includes only first and second thin films, namely a first thin film of ruthenium (Ru) and one or more thin films of a metallic oxide such as nickel oxide (NiO), tantalum oxide (Ta$_2$O$_3$) and aluminum oxide (Al$_2$O$_5$). In a preferred embodiment the metallic oxide thin film is nickel oxide (NiO). In regard to a preferred range of thicknesses and a preferred thickness, the ruthenium thin film 504 may be between 3 Å to 30 Å with a preferred thickness of 10 Å and the metallic oxide thin film 506 may be between 5 Å to 50 Å with a preferred thickness of 25 Å. The tantalum (Ta) thin film 508 is for the purpose of protecting the spin valve sensor from subsequent processing steps. The tantalum (Ta) 508 thin film may be in a range of 20 Å to 100 Å with a preferred thickness of 35 Å. It should be noted that when a tantalum (Ta) layer is subjected to air that it will be oxidized to tantalum oxide (Ta$_2$O$_5$), which is a metallic oxide, throughout a thickness of about 35 Å.

Regarding layers of thicknesses and preferred thicknesses of the other layers, the pinning layer 218 may be from 250 Å to 600 Å with a preferred thickness of 425 Å, the coupling layer 224 may be nickel iron (NiFe) from 3 Å to 30 Å with a preferred thickness of 10 Å, the first ferromagnetic thin film 212 may be cobalt iron (CoFe) from 10 Å to 50 Å with a preferred thickness of 24 Å, the AP coupling layer 210 may be ruthenium (Ru) from 3 Å to 10 Å with a preferred thickness of 8 Å, the second ferromagnetic thin film 214 may be cobalt iron (CoFe) from 10 Å to 50 Å with a preferred thickness of 24 Å, the spacer layer 204 may be copper (Cu) from 15 Å to 35 Å with a preferred thickness of 24 Å, the free layer 208 may be nickel iron (NiFe) from 15 Å to 100 Å with a preferred thickness of 62 Å and the interlayer 230 may be cobalt iron (CoFe) from 3 Å to 20 Å with a preferred thickness of 5 Å.

Figure 16:
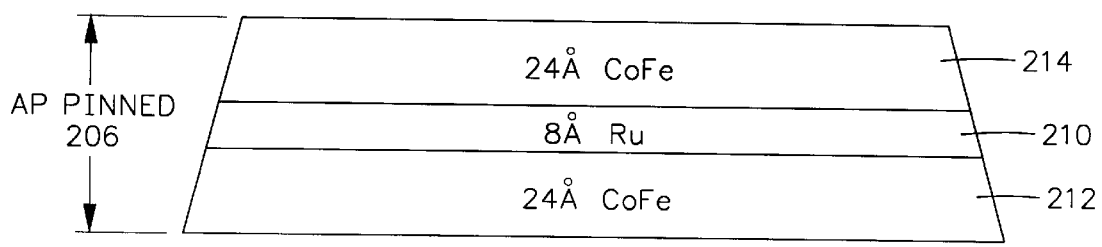
FIG. 16 is an ABS illustration of an antiparallel (AP) pinned structure.
Figure 17:
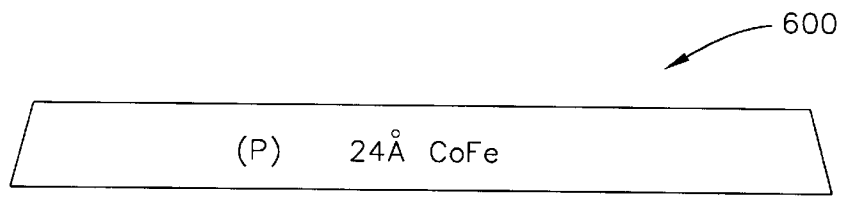
FIG. 17 is an ABS illustration of a simple pinned layer of a spin valve.

It should be understood that the spin valve sensor 500 shown at FIG. 15 may be either an AP pinned spin valve sensor, as shown in FIG. 15, or a simple spin valve sensor which has a slightly modified pinned layer. The AP pinned layer 206 of FIG. 15 is shown in FIG. 16 for comparison with the simple pinned layer 600 shown in FIG. 17. The simple pinned layer 600 is a single ferromagnetic thin film such as cobalt iron (CoFe) which may have a thickness range of 5 Å to 50 Å with a preferred thickness of 20 Å. The advantage of the AP pinned layer 206 is that the demagnetization fields from the magnetic moments 216 and 220 counterbalance one another so that the net demagnetization field on the free layer 208 can be virtually zero. The demagnetization field 602 on the single layer 600 is not counterbalanced. The AP pinned layer 206 makes it easier to counterbalance magnetic forces acting on the free layer so that it will be less stiff to applied magnetic bits of information from the rotating magnetic disk.

Further, a thin layer of cobalt iron (CoFe), such as 5 Å–10 Å, may be employed between the free layer 208 and the pinned layer structure for increasing the magnetoresistive coefficient (dr/R). This layer is sometimes referred to as a nanolayer.

Clearly, other embodiments and modifications of this invention will occur readily to those of ordinary skill in the art in view of these teachings. For instance, the spin valve sensor may be employed for purposes other than in a magnetic disk drive, such as a tape drive search and/or surveillance devices and laboratory equipment. Therefore, this invention is to be limited only by the following claims, which include all such embodiments and modifications when viewed in conjunction with the above specification and the accompanying drawings.

I claim:

1. A magnetic read head comprising:
    a spin valve sensor, the spin valve sensor including:
        a ferromagnetic free layer structure;
        a ferromagnetic pinned layer structure;
        a nonmagnetic electrically conductive spacer layer located between the free layer structure and the pinned layer structure;
        an antiferromagnetic pinning layer exchange coupled to the pinned layer structure for pinning a magnetic moment of the pinned layer structure;
        the pinned layer structure being located between the pinning layer and the spacer layer;
        a cap layer structure including a ruthenium (Ru) layer and a metal oxide layer; and
        the ruthenium (Ru) layer interfacing the free layer structure and being located between the metal oxide layer and the free layer structure.

2. A magnetic read head as claimed in claim 1 wherein the pinned layer structure is an antiparallel (AP) pinned layer structure that comprises:
    first and second ferromagnetic pinned layers with the first pinned layer being pinned by the pinning layer in a first direction; and
    an antiparallel coupling layer located between the first and second pinned layers so that the second pinned layer is pinned antiparallel to said first direction in a second direction.

3. A magnetic read head as claimed in claim 1 wherein the pinned layer structure consists of a single ferromagnetic pinned layer.

4. A magnetic read head as claimed in claim 1 wherein the read head further includes:
    electrically conductive first and second lead layers connected to first and side edges of the spin valve sensor;
    nonmagnetic electrically insulative first and second read gap layers;
    the spin valve sensor and the first and second lead layers being located between the first and second read gap layers;
    ferromagnetic first and second shield layers; and
    the first and second gap layers being located between the first and second shield layers.

5. A magnetic read head as claimed in claim 4 wherein the metal oxide layer is nickel oxide (NiO).

6. A magnetic read head as claimed in claim 5 including:
    the free layer structure having a nickel iron (NiFe) layer and a cobalt iron (CoFe) layer; and
    the cobalt iron (CoFe) layer being located between the nickel iron (NiFe) layer and the ruthenium (Ru) layer.

7. A magnetic read head as claimed in claim 6 further comprising:
    the cap layer structure also including a tantalum (Ta) layer; and
    the tantalum (Ta) layer having a thickness in a range of 20–100 Å.

8. A magnetic read head as claimed in claim 7 wherein the ruthenium (Ru) layer has a thickness of 10 Å.

9. A magnetic read head as claimed in claim 4 wherein the ruthenium (Ru) layer has a thickness in a range of 3–30 Å.

10. A magnetic read head as claimed in claim 9 wherein the metal oxide layer is selected from a group comprising nickel oxide (NiO), tantalum oxide (Ta$_2$O$_3$) and aluminum oxide (Al$_2$O$_5$).

11. A magnetic read head comprising:
    a spin valve sensor, the spin valve sensor including:
        a ferromagnetic free layer structure;
        a ferromagnetic pinned layer structure;
        a nonmagnetic electrically conductive spacer layer located between the free layer structure and the pinned layer structure;

an antiferromagnetic pinning layer exchange coupled to the pinned layer structure for pinning a magnetic moment of the pinned layer structure;

the pinned layer structure being located between the pinning layer and the spacer layer;

a cap layer structure including a ruthenium (Ru) layer and a metal oxide layer;

the ruthenium (Ru) layer being located between the metal oxide layer and the free layer structure;

the ruthenium (Ru) layer having a thickness in a range of 3–30 Å; and the metal oxide layer being selected from a group comprising nickel oxide (NiO), tantalum oxide ($Ta_2O_3$) and aluminum oxide ($Al_2O_5$); and the metal oxide layer having a thickness in a range of 5–50 Å;

electrically conductive first and second lead layers connected to first and side edges of the spin valve sensor;

nonmagnetic electrically insulative first and second read gap layers;

the spin valve sensor and the first and second lead layers being located between the first and second read gap layers;

ferromagnetic first and second shield layers; and the first and second gap layers being located between the first and second shield layers.

12. A magnetic read head as claimed in claim 11 wherein the cap layer structure further includes a tantalum (Ta) layer with the metal oxide layer being located between the ruthenium (Ru) layer and the tantalum (Ta) layer.

13. A magnetic read head as claimed in claim 12 wherein the tantalum layer has a thickness in a range of 20–100 Å.

14. A magnetic read head as claimed in claim 13 including:

the free layer structure having a nickel iron (NiFe) layer and a cobalt iron (CoFe) layer; and the cobalt iron (CoFe) layer being located between the nickel iron (NiFe) layer and the ruthenium (Ru) layer.

15. A magnetic read head as claimed in claim 14 wherein the cobalt iron (CoFe) layer has a thickness in a range of 3–20 Å.

16. A magnetic read head as claimed in claim 15 wherein the pinned layer structure is an antiparallel (AP) pinned layer structure that comprises:

first and second ferromagnetic pinned layers with the first pinned layer being pinned by the pinning layer in a first direction; and an antiparallel coupling layer located between the first and second pinned layers so that the second pinned layer is pinned antiparallel to said first direction in a second direction.

17. A magnetic read head as claimed in claim 15 wherein the pinned layer structure consists of a single ferromagnetic pinned layer.

18. A magnetic read head comprising:

a spin valve sensor, the spin valve sensor including:
a ferromagnetic free layer structure;
a ferromagnetic pinned layer structure;
a nonmagnetic electrically conductive spacer layer located between the free layer structure and the pinned layer structure;
an antiferromagnetic pinning layer exchange coupled to the pinned layer structure for pinning a magnetic moment of the pinned layer structure;
the pinned layer structure being located between the pinning layer and the spacer layer;

a cap layer structure including a ruthenium (Ru) layer and a metal oxide layer;
the ruthenium (Ru) layer being located between the metal oxide layer and the free layer structure;
the ruthenium (Ru) layer having a thickness of 10 Å;
the metal oxide layer being nickel oxide (NiO);
the metal oxide layer having a thickness of 25 Å;
the free layer structure having a nickel iron (NiFe) layer and a cobalt iron (CoFe) layer;
the cobalt iron (CoFe) layer being located between the nickel iron (NiFe) layer and the ruthenium (Ru) layer;
the cap layer structure also including a tantalum (Ta) layer; and
the tantalum (Ta) layer having a thickness in a range of 20–100 Å;

electrically conductive first and second lead layers connected to first and side edges of the spin valve sensor;

nonmagnetic electrically insulative first and second read gap layers;

the spin valve sensor and the first and second lead layers being located between the first and second read gap layers;

ferromagnetic first and second shield layers; and the first and second gap layers being located between the first and second shield layers.

19. A magnetic read head as claimed in claim 18 wherein the tantalum layer has a thickness of 35 Å.

20. A magnetic read head as claimed in claim 19 wherein the cobalt iron (CoFe) iron layer has a thickness of 5 Å.

21. A magnetic head assembly comprising:

a write head including:
first and second pole piece layers;
each of the first and second pole piece layers having a yoke portion located between a pole tip portion and a back gap portion;
a nonmagnetic electrically insulative write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and a read head including:
a spin valve sensor that has first and second side edges;
first and second lead layers connected to the first and second side edges of the spin valve sensor;
nonmagnetic electrically insulative first and second read gap layers;
the spin valve sensor and the first and second lead layers being located between the first and second read gap layers;
a ferromagnetic first shield layer; and
the first and second read gap layers being located between the first shield layer and the first pole piece layer; and the spin valve sensor including:
a ferromagnetic free layer structure;
a ferromagnetic pinned layer structure;
a nonmagnetic electrically conductive spacer layer located between the free layer structure and the pinned layer structure;
an antiferromagnetic pinning layer exchange coupled to the pinned layer structure for pinning a magnetic moment of the pinned layer structure;

the pinned layer structure being located between the pinning layer and the spacer layer;

a cap layer structure having a ruthenium (Ru) layer and a metal oxide layer; and the ruthenium (Ru) layer interfacing the free layer structure and being located between the metal oxide layer and the free layer structure.

22. A magnetic head assembly as claimed in claim 21 including:

a ferromagnetic second shield layer;

a nonmagnetic isolation layer; and the isolation layer being located between the second shield layer and the first pole piece layer.

23. A magnetic head assembly as claimed in claim 21 wherein the pinned layer structure is an antiparallel (AP) pinned layer structure that comprises:

first and second ferromagnetic pinned layers with the first pinned layer being pinned by the pinning layer in a first direction; and an antiparallel coupling layer located between the first and second pinned layers so that the second pinned layer is pinned antiparallel to said first direction in a second direction.

24. A magnetic head assembly as claimed in claim 21 wherein the pinned layer structure consists of a single ferromagnetic pinned layer.

25. A magnetic head assembly as claimed in claim 21 wherein the ruthenium (Ru) layer has a thickness in a range of 3–30 Å.

26. A magnetic head assembly as claimed in claim 25 wherein the metal oxide layer is selected from a group comprising nickel oxide (NiO), tantalum oxide ($Ta_2O_3$) and aluminum oxide ($Al_2O_5$).

27. A magnetic head assembly comprising:

a write head including:

first and second pole piece layers;

each of the first and second pole piece layers having a yoke portion located between a pole tip portion and a back gap portion;

a nonmagnetic electrically insulative write gap layer located between the pole tip portions of the first and second pole piece layers;

an insulation stack with at least one coil layer embedded therein located between the yoke portions of the first and second pole piece layers; and the first and second pole piece layers being connected at their back gaps portions; and a read head including:

a spin valve sensor that has first and second side edges;

first and second lead layers connected to the first and second side edges of the spin valve sensor;

nonmagnetic electrically insulative first and second read gap layers;

the spin valve sensor and the first and second lead layers being located between the first and second read gap layers;

a ferromagnetic first shield layer; and the first and second read gap layers being located between the first shield layer and the first pole piece layer; and the spin valve sensor including:

a ferromagnetic free layer structure;

a ferromagnetic pinned layer structure;

a nonmagnetic electrically conductive spacer layer located between the free layer structure and the pinned layer structure;

an antiferromagnetic pinning layer exchange coupled to the pinned layer structure for pinning a magnetic moment of the pinned layer structure;

the pinned layer structure being located between the pinning layer and the spacer layer;

a cap layer structure having a ruthenium (Ru) layer and a metal oxide layer;

the ruthenium (Ru) layer being located between the metal oxide layer and the free layer structure;

the ruthenium (Ru)layer having a thickness in a range of 3–30 Å;

the metal oxide layer being selected from a group comprising nickel oxide (NiO), tantalum oxide ($Ta_2O_3$) and aluminum oxide ($Al_2O_5$); and the metal oxide layer having a thickness in a range of 5–50 Å.

28. A magnetic head assembly as claimed in claim 27 wherein the cap layer structure further includes a tantalum (Ta) layer with the metal oxide layer being located between the ruthenium (Ru) layer and the tantalum (Ta) layer.

29. A magnetic head assembly as claimed in claim 28 wherein the tantalum layer has a thickness in a range of 20–100 Å.

30. A magnetic head assembly as claimed in claim 29 including:

the free layer structure having a nickel iron (NiFe) layer and a cobalt iron (CoFe) layer; and the cobalt iron (CoFe) layer being located between the nickel iron (NiFe) layer and the ruthenium (Ru) layer.

31. A magnetic head assembly as claimed in claim 30 wherein the cobalt iron (CoFe) layer has a thickness in a range of 3–20 Å.

32. A magnetic head assembly as claimed in claim 31 including:

a ferromagnetic second shield layer;

a nonmagnetic isolation layer; and the isolation layer being located between the second shield layer and the first pole piece layer.

33. A magnetic head assembly as claimed in claim 31 wherein the pinned layer structure is an antiparallel (AP) pinned layer structure that comprises:

first and second ferromagnetic pinned layers with the first pinned layer being pinned by the pinning layer in a first direction; and an antiparallel coupling layer located between the first and second pinned layers so that the second pinned layer is pinned antiparallel to said first direction in a second direction.

34. A magnetic head assembly as claimed in claim 31 wherein the pinned layer structure consists of a single ferromagnetic pinned layer.

35. A magnetic disk drive that includes at least one slider, the slider supporting a magnetic head assembly that has a write head and a read head, the disk drive comprising:

the write head including:

first and second pole piece layers;

each of the first and second pole piece layers having a yoke portion located between a pole tip portion and a back gap portion;

a nonmagnetic electrically insulative write gap layer located between the pole tip portions of the first and second pole piece layers;

an insulation stack with at least one coil layer embedded therein located between the yoke portions of the first and second pole piece layers; and the first and second pole piece layers being connected at their back gaps portions; and the read head including:

a spin valve sensor that has first and second side edges;

first and second lead layers connected to the first and second side edges of the spin valve sensor;

nonmagnetic electrically insulative first and second read gap layers;

the spin valve sensor and the first and second lead layers being located between the first and second read gap layers;

a ferromagnetic first shield layer; and the first and second read gap layers being located between the first shield layer and the first pole piece layer; and the spin valve sensor including:
 a ferromagnetic free layer structure;
 a ferromagnetic pinned layer structure;
 a nonmagnetic electrically conductive spacer layer located between the free layer structure and the pinned layer structure;
 an antiferromagnetic pinning layer exchange coupled to the pinned layer structure for pinning a magnetic moment of the pinned layer structure;
 the pinned layer structure being located between the pinning layer and the spacer layer;
 a cap layer structure having a ruthenium (Ru) layer and a metal oxide layer; and
 the ruthenium (Ru) layer interfacing the free layer structure and being located between the metal oxide layer and the free layer structure; and a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

means for rotating the magnetic disk;

positioning means connected to the support for moving the magnetic head assembly to multiple positions with respect to said magnetic disk; and processing means, that is connected to the means for rotating the magnetic disk, the positioning means and the magnetic head assembly for rotating the magnetic disk, positioning the magnetic head assembly relative to the rotating magnetic disk and exchanging signals with the magnetic head assembly.

36. A magnetic disk drive as claimed in claim 35 including:
 a ferromagnetic second shield layer;
 a nonmagnetic isolation layer; and
 the isolation layer being located between the second shield layer and the first pole piece layer.

37. A magnetic disk drive as claimed in claim 35 wherein the ruthenium (Ru)layer has a thickness in a range of 3–30 Å.

38. A magnetic disk drive as claimed in claim 37 wherein the metal oxide layer is selected from a group comprising nickel oxide (NiO), tantalum oxide ($Ta_2O_3$) and aluminum oxide ($Al_2O_5$).

39. A magnetic disk drive that includes at least one slider, the slider supporting a magnetic head assembly that has a write head and a read head the disk drive comprising:
 the write head including:
  first and second pole piece layers;
  each of the first and second pole piece layers having a yoke portion located between a pole tip portion and a back gap portion;
  a nonmagnetic electrically insulative write gap layer located between the pole tip portions of the first and second pole piece layers;
  an insulation stack with at least one coil layer embedded therein located between the yoke portions of the first and second pole piece layers; and the first and second pole piece layers being connected at their back gaps portions; and the read head including:
 a spin valve sensor that has first and second side edges;
 first and second lead layers connected to the first and second side edges of the spin valve sensor;
 nonmagnetic electrically insulative first and second read gap layers;
 the spin valve sensor and the first and second lead layers being located between the first and second read gap layers;
 a ferromagnetic first shield layer; and
 the first and second read gap layers being located between the first shield layer and the first pole piece layer; and the spin valve sensor including:
 a ferromagnetic free layer structure;
 a ferromagnetic pinned layer structure;
 a nonmagnetic electrically conductive spacer layer located between the free layer structure and the pinned layer structure;
 an antiferromagnetic pinning layer exchange coupled to the pinned layer structure for pinning a magnetic moment of the pinned layer structure;
 the pinned layer structure being located between the pinning layer and the spacer layer;
 a cap layer structure having a ruthenium (Ru) layer and a metal oxide layer; and
 the ruthenium (Ru) layer being located between the metal oxide layer and the free layer structure;
 the ruthenium (Ru) layer having a thickness in a range of 3–30 Å;
 the metal oxide layer being selected from a group comprising nickel oxide (NiO) tantalum oxide ($Ta_2O_3$) and aluminum oxide ($Al_2O_5$); and
 the metal oxide layer having a thickness in a range of 5–50 Å;

a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

means for rotating the magnetic disk;

positioning means connected to the support for moving the magnetic head assembly to multiple positions with respect to said magnetic disk; and processing means, that is connected to the means for rotating the magnetic disk, the positioning means and the magnetic head assembly for rotating the magnetic disk, positioning the magnetic head assembly relative to the rotating magnetic disk and exchanging signals with the magnetic head assembly.

40. A magnetic disk drive as claimed in claim 39 wherein the cap layer structure further includes a tantalum (Ta) layer with the metal oxide layer being located between the ruthenium (Ru) layer and the tantalum (Ta) layer.

41. A magnetic disk drive as claimed in claim 40 wherein the tantalum layer has a thickness in a range of 20–100 Å.

42. A magnetic disk drive as claimed in claim 41 including:
 the free layer structure having a nickel iron (NiFe) layer and a cobalt iron (CoFe) layer; and
 the cobalt iron (CoFe) layer being located between the nickel iron (NiFe) layer and the ruthenium (Ru) layer.

43. A magnetic disk drive as claimed in claim 42 wherein the cobalt iron (CoFe) layer has a thickness in a range of 3–20 Å.

44. A method of making a magnetic head assembly comprising the steps of:
    making a read head as follows:
        forming a ferromagnetic first shield layer;
        forming a nonmagnetic electrically insulative first read gap layer on the first shield layer; and
        forming a spin valve sensor on the first read gap layer;
    the forming of the spin valve sensor comprising the steps of:
        forming an antiferromagnetic pinning layer on the first read gap layer;
        forming a pinned layer structure on the pinning layer;
        forming a nonmagnetic electrically conductive spacer layer on the pinned layer structure;
        forming a ferromagnetic free layer structure on the spacer layer; and
        forming a cap layer structure on the free layer structure;
    the forming of the cap layer structure comprising the steps of:
        forming a ruthenium (Ru) layer directly on the free layer structure; and
        forming a metal oxide layer on the ruthenium (Ru) layer.

45. A method as claimed in claim 44 wherein the pinned layer structure is formed as follows:
    forming a ferromagnetic first pinned layer on the pinning layer;
    forming an antiparallel coupling layer on the first pinned layer; and
    forming a ferromagnetic second pinned layer on the antiparallel coupling layer.

46. A method as claimed in claim 44 wherein the pinned layer structure is formed as follows:
    forming a single ferromagnetic layer on the pinning layer.

47. A method as claimed in claim 44 further including the steps of:
    connecting first and second lead layers to first and second side edges of the spin valve sensor;
    forming a nonmagnetic electrically insulative second read gap layer on the spin valve sensor and the first and second lead layers;
    forming a write head on the second read gap layer;
    the forming of the write head comprising the steps of:
        forming a ferromagnetic first pole piece layer on the second read gap
    layer wherein the first pole piece layer has a yoke region located between a pole tip region and a back gap region;
        forming a nonmagnetic electrically insulative write gap layer on the first pole piece layer in the pole tip region;
        forming an insulation stack with at least one coil layer embedded therein on the first pole piece layer in the yoke region;
        the forming of the write gap layer and the forming of the insulation stack being in an unordered sequence with respect to each other; and
        connecting the first and second pole piece layers together at the back gap region.

48. A method as claimed in claim 47 further including the steps of:
    before forming the write head forming a second shield layer on the second read gap layer;
    forming a nonmagnetic isolation layer on the second shield layer; and
    said forming of the write head being on said isolation layer.

49. A method as claimed in claim 47 wherein the ruthenium (Ru) layer is formed with a thickness in a range of 3–30 Å.

50. A method as claimed in claim 49 wherein the metal oxide layer is formed from a group comprising nickel oxide (NiO), tantalum oxide ($Ta_2O_3$) and aluminum oxide ($Al_2O_3$).

51. A method as claimed in claim 47 wherein the metal oxide layer is formed from a group comprising nickel oxide (NiO), tantalum oxide ($Ta_2O_3$) and aluminum oxide ($Al_2O_3$).

52. A method as claimed in claim 51 wherein the forming of the free layer structure further includes:
    forming a ferromagnetic nickel iron (NiFe) first free layer on the spacer layer; and
    forming a ferromagnetic cobalt iron (CoFe) second free layer on the first free layer.

53. A method as claimed in claim 52 wherein the forming of the cap layer structure further includes forming a tantalum (Ta) layer on the metal oxide layer.

54. A method of making a magnetic head assembly comprising the steps of:
    making a read head as follows:
        forming a ferromagnetic first shield layer;
        forming a nonmagnetic electrically insulative first read gap layer on the first shield layer; and
        forming a spin valve sensor on the first read gap layer;
    the forming of the spin valve sensor comprising the steps of:
        forming an antiferromagnetic pinning layer on the first read gap layer;
        forming a pinned layer structure on the pinning layer;
        forming a nonmagnetic electrically conductive spacer layer on the pinned layer structure;
        forming a ferromagnetic free layer structure on the spacer layer; and
        forming a cap layer structure on the free layer structure;
    the forming of the cap layer structure comprising the steps of:
        forming a ruthenium (Ru) layer on the free layer structure;
        forming a metal oxide layer on the ruthenium (Ru) layer;
        the ruthenium (Ru) layer being formed with a thickness in a range of 3–30 Å; and
        the metal oxide layer being formed from a group comprising nickel oxide (NiO), tantalum oxide ($Ta_2O_3$) and aluminum oxide ($Al_2O_3$; and
        the metal oxide layer being formed with a thickness in the range of 5–50 Å; further making the read head as follows:
    connecting first and second lead layers to first and second side edges of the spin valve sensor;
    forming a nonmagnetic electrically insulative second read gap layer on the spin valve sensor and the first and second lead layers; and
    forming a write head on the second read gap layer:
    the forming of the write head comprising the steps of:
        forming a ferromagnetic first pole piece layer on the second read gap layer wherein the first pole piece layer has a yoke region located between a pole tip region and a back gap region;
        forming a nonmagnetic electrically insulative write Rap layer on the first pole piece layer in the pole tip region;

forming an insulation stack with at least one coil layer embedded therein on the first pole piece layer in the yoke region;

the forming of the write gap layer and the forming of the insulation stack being in an unordered sequence with respect to each other; and connecting the first and second pole piece layers together at the back gap region.

55. A method as claimed in claim 54 wherein the forming of the cap layer structure further includes forming a tantalum (Ta) layer on the metal oxide layer.

56. A method as claimed in claim 55 wherein the tantalum (Ta) layer is formed with a thickness in a range of 20–100 Å.

57. A method as claimed in claim 56 wherein the forming of the free layer structure further includes:

forming a ferromagnetic nickel iron (NiFe) first free layer on the spacer layer; and forming a ferromagnetic cobalt iron (CoFe) second free layer on the first free layer.

58. A method as claimed in claim 57 wherein the cobalt iron (CoFe) second free layer is formed with a thickness in the range of 3–20 Å.

59. A method as claimed in claim 58 further including the steps of:

before forming the write head forming a second shield layer on the second read gap layer;

forming a nonmagnetic isolation layer on the second shield layer; and said forming of the write head being on said isolation layer.

60. A method as claimed in claim 58 wherein the pinned layer structure is formed as follows:

forming a ferromagnetic first pinned layer on the pinning layer;

forming an antiparallel coupling layer on the first pinned layer; and forming a ferromagnetic second pinned layer on the antiparallel coupling layer.

61. A method as claimed in claim 58 wherein the pinned layer structure is formed as follows:

forming a single ferromagnetic layer on the pinning layer.

\* \* \* \* \*